United States Patent
Liao et al.

(10) Patent No.: US 8,291,147 B2
(45) Date of Patent: Oct. 16, 2012

(54) COMPUTER MOTHERBOARD WITH ADJUSTABLE CONNECTION BETWEEN CENTRAL PROCESSING UNIT AND PERIPHERAL INTERFACES

(75) Inventors: Tsung-Kuel Liao, Taipei Hsien (TW); Te-Chung Kuan, Taipei Hsien (TW); Fu-Chiao Shih, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 196 days.

(21) Appl. No.: 12/797,741

(22) Filed: Jun. 10, 2010

(65) Prior Publication Data

US 2011/0197012 A1    Aug. 11, 2011

(30) Foreign Application Priority Data

Feb. 8, 2010   (TW) ............................... 99103871 A

(51) Int. Cl.
    *G06F 13/00*      (2006.01)
(52) U.S. Cl. .......................... 710/316; 710/313; 710/311
(58) Field of Classification Search .......... 710/300–317, 710/104–110, 8–19, 62–64

See application file for complete search history.

(56) References Cited

U.S. PATENT DOCUMENTS

| | | | | |
|---|---|---|---|---|
| 7,065,672 B2* | 6/2006 | Long et al. | ...................... | 714/11 |
| 7,325,086 B2* | 1/2008 | Kong et al. | ................... | 710/307 |
| 7,363,417 B1* | 4/2008 | Ngai | ............................. | 710/316 |
| 7,539,801 B2* | 5/2009 | Xie et al. | ....................... | 710/104 |
| 7,600,112 B2* | 10/2009 | Khatri et al. | .................. | 713/100 |
| 7,689,751 B2* | 3/2010 | Feehrer | ......................... | 710/301 |
| 7,783,818 B1* | 8/2010 | Sardella et al. | ............... | 710/313 |
| 7,934,032 B1* | 4/2011 | Sardella et al. | ............... | 710/104 |
| 7,996,591 B2* | 8/2011 | Xie et al. | ....................... | 710/104 |
| 2002/0144175 A1* | 10/2002 | Long et al. | ....................... | 714/11 |
| 2007/0139423 A1* | 6/2007 | Kong et al. | ................... | 345/502 |
| 2007/0206630 A1* | 9/2007 | Bird | ............................. | 370/465 |
| 2008/0052436 A1* | 2/2008 | Sharma et al. | ............... | 710/301 |
| 2009/0167771 A1* | 7/2009 | Franko et al. | ................. | 345/502 |
| 2009/0204736 A1* | 8/2009 | Xie et al. | ....................... | 710/104 |
| 2010/0180110 A1* | 7/2010 | Mittapalli et al. | ............ | 713/100 |
| 2010/0257301 A1* | 10/2010 | Kloeppner et al. | ........... | 710/313 |
| 2011/0010481 A1* | 1/2011 | Hamadani et al. | ............ | 710/313 |
| 2011/0113178 A1* | 5/2011 | Hosoi et al. | .................... | 710/313 |

* cited by examiner

*Primary Examiner* — Raymond Phan

(74) *Attorney, Agent, or Firm* — Altis Law Group, Inc.

(57) ABSTRACT

A computer motherboard includes first and second peripheral interfaces, a switching interface, a switching card inserted into the switching card, and first and second central processing unit (CPU) sockets. The switching interface is placed between the first and second peripheral interfaces. The switching card includes first and second interface. Pins of the first interface of the switching card are interconnected, and pins of the second interface of the switching card are interconnected. Connection between the first and second peripheral sockets and the first and second CPU sockets is adjustable by selectively connecting one of the first and second interfaces of the switching card to the switching interface.

5 Claims, 3 Drawing Sheets

COMPUTER MOTHERBOARD WITH ADJUSTABLE CONNECTION BETWEEN CENTRAL PROCESSING UNIT AND PERIPHERAL INTERFACES

BACKGROUND

1. Technical Field

The present disclosure relates to computer motherboards, and more particularly to a computer motherboard with adjustable connection between central processing unit sockets and peripheral interfaces.

2. Description of Related Art

Some computer motherboards may include several central processing unit (CPU) sockets connected to several peripheral interfaces, such as peripheral component interconnect express (PCIE) interfaces. Each of the CPU sockets is dedicated to at least one of the peripheral interfaces. If an CPU socket is damaged or removed or idle, the peripheral interface associated with the CPU socket will go unused, so the hardware of the computer motherboard is wasted. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure incorporating with the accompanying drawings in which like references indicate similar elements is illustrated by way of examples. It should be noted that references to "an" or "one" embodiment in this disclosure are not necessarily to the same embodiment, and such references mean at least one.

Figure 1:
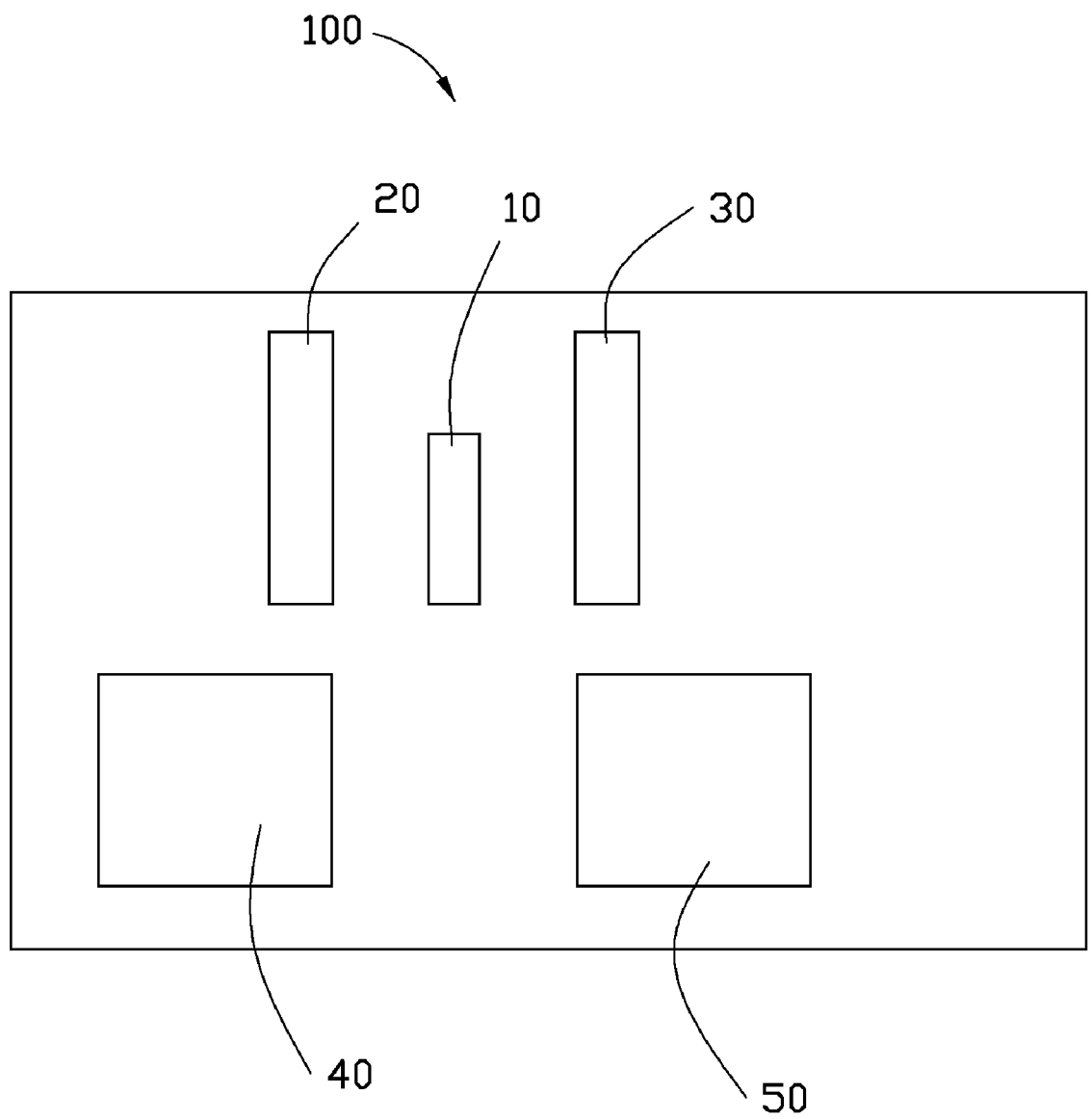
FIG. 1 is a top plan view of an exemplary embodiment of a computer motherboard having two central processing unit (CPU) sockets, two peripheral interfaces, and a switching interface.
Figure 2:
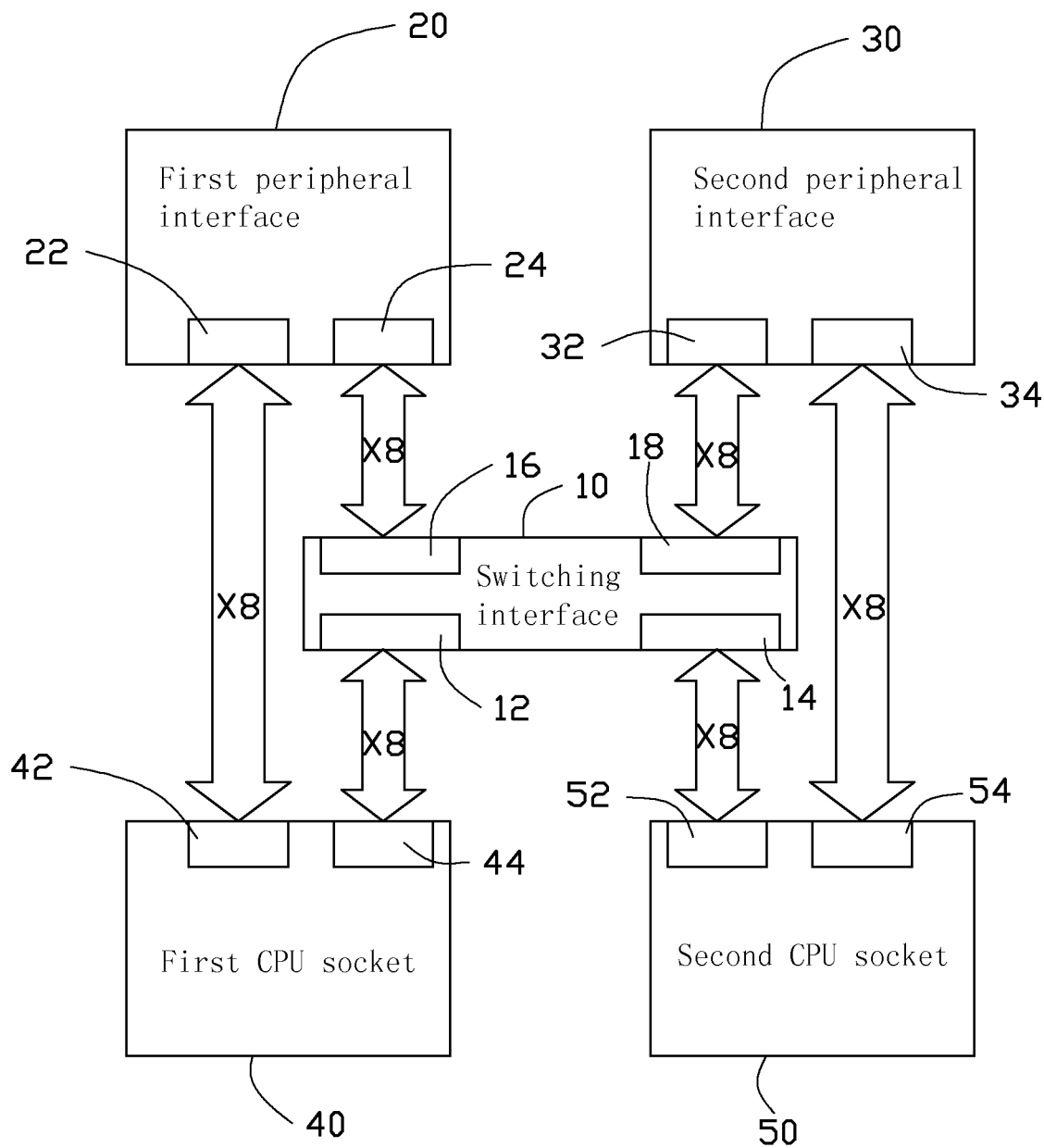
FIG. 2 is a schematic diagram of FIG. 1, illustrating connections between the CPU sockets, the peripheral interfaces, and the switching interface.
Figure 3:
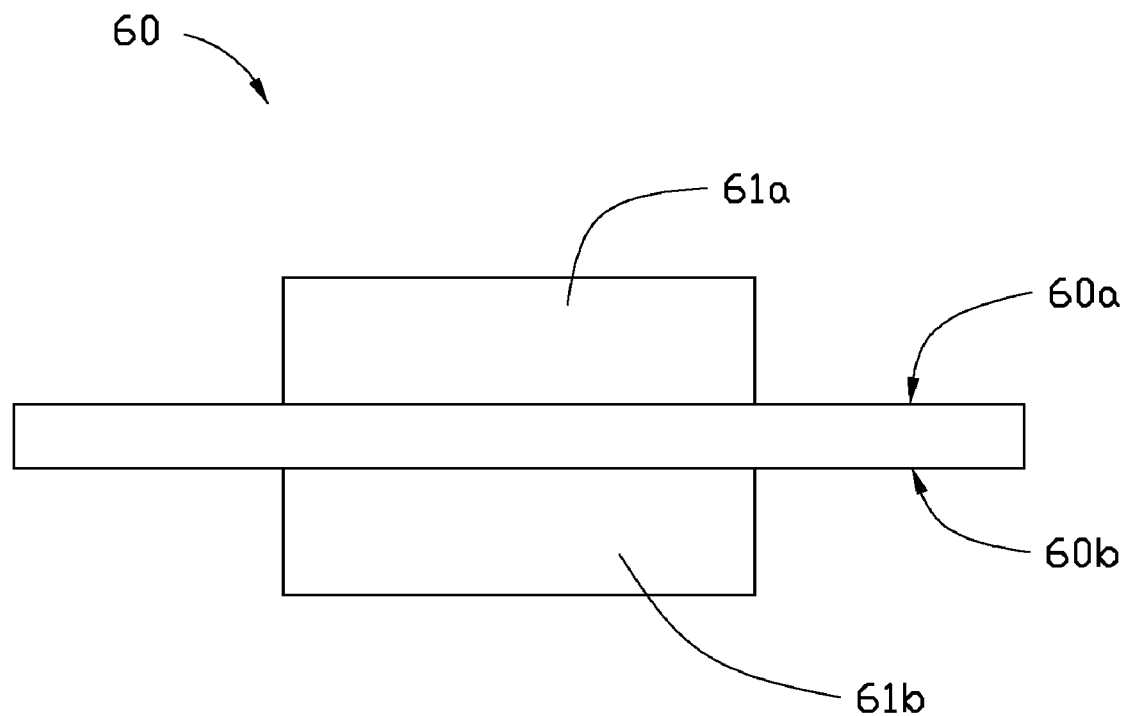
FIG. 3 is a side plan view of an exemplary embodiment of the switching card.

Referring to FIGS. 1 to 3, an exemplary embodiment of a computer motherboard 100 includes a switching interface 10, a first peripheral interface 20, a second peripheral interface 30, a first central processing unit (CPU) socket 40, a second CPU socket 50, and a switching card 60. The switching interface 10 may be placed between the first and second peripheral interfaces 20 and 30, or may be on other positions in other embodiments. The first peripheral interface 20 includes first and second groups of pins 22 and 24. The second peripheral interface 30 includes third and fourth groups of pins 32 and 34. The first CPU socket 40 includes fifth and sixth groups of pins 42 and 44. The second CPU socket 50 includes seventh and eighth groups of pins 52 and 54. The switching interface 10 includes ninth to twelfth groups of pins 12, 14, 16, and 18.

The switching card 60 includes a first interface 61a and a second interface 61b respectively mounted to centers of a top 60a and a bottom 61b of the switching card 60. The first and second interfaces 61a and 61b of the switching card 60 both mate with the switching interface 10. The switching interface 10 may be a male board to board (B2B) connector, the first and second interface 61a and 61b of the switching card 60 may be female B2B connectors. Pins of the first interface 61a may be interconnected via a first connection circuit (not shown), pins of the second interface 61b may be interconnected via a second connection circuit (not shown). The first connection circuit being different from the second connection circuit.

When the first interface 61a of the switching card 60 is connected to the switching interface 10, the ninth and tenth groups of pins 12 and 14 of the switching interface 10 are respectively connected to the eleventh and twelfth groups of pins 16 and 18 of the switching interface 10, by the first connection circuit of the switching card 60. When the second interface 61b of the switching card 60 is connected to the switching interface 10, the ninth group of pins 12 is connected to the twelfth group of pins 18 of the switching interface 10 by the second connection circuit of the switching card 60, the tenth and eleventh groups of pins 14 and 16 of the switching interface 10 are idle.

The first and second peripheral interfaces 20 and 30 are both peripheral component interconnect express (PCIE) interfaces. The fifth group of pins 42 is connected to the first group of pins 22, and the sixth group of pins 44 is connected to the ninth group of pins 12. The seventh group of pins 52 is connected to the tenth group of pins 14, and the eighth group of pins 54 connected to the fourth group of pins 34. The second group of pins 24 is connected to the eleventh group of pins 16. The third group of pins 32 is connected to the twelfth group of pins 18. Each group of pins of the switching interface 10, the first peripheral interface 20, the second peripheral interface 30, the first CPU socket 40, and the second CPU socket 50 function as eight signal channels, and each signal channel includes at least one pair of first pins for outputting differential signals and at least one pair of second pins for receiving differential signals.

In use, when a first CPU (not shown) is mounted to the first CPU socket 40, a second CPU (not shown) is mounted to the second CPU socket 50, first and second peripheral cards supporting sixteen signal channels (not shown) are respectively mounted to the first and second peripheral interfaces 20 and 30, and the switching interface 10 is free, the first CPU is connected to the first peripheral card by the fifth group of pins 42 and the first group of pins 22, so there are eight available signal channels in the first peripheral card. The second CPU is connected to the second peripheral card by the eighth group of pins 54 and the fourth group of pins 34, so there are eight available signal channels in the second peripheral card. When the switching interface 10 is connected to the first interface 61a, the ninth and tenth groups of pins 12 and 14 are respectively connected to the eleventh and twelfth groups of pins 16 and 18, then there are sixteen available signal channels between the first CPU and the first peripheral card, and sixteen available signal channels between the second CPU and the second peripheral card.

When a CPU is installed in the first CPU socket 40, the second CPU socket 50 is left empty, a first and a second peripheral cards supporting sixteen signal channels are installed in the first and second peripheral interface 20 and 30, and the switching interface 10 is idle, the CPU is connected to the first peripheral card through the fifth group of pins 42 of the CPU socket 40 and the first group of pins 22 of the first peripheral interface 20, the number of available signal channels of the first peripheral card is eight, the second peripheral card is idle because it is not connected to any CPU. When the second interface 61b of the switching card 60 is connected to the switching interface 10, the ninth group of pins 12 is connected to the twelfth group of pins 18, the tenth and eleventh groups of pins 14 and 16 are idle, the CPU is connected to the first peripheral card through the fifth group of pins 42 and the first group of pins 22, and the CPU is also connected to the second peripheral card through the sixth group of pins 44, the ninth and twelfth groups of pins 12 and 18, and the third group of pins 32. There are eight available signal channels in both the first and second peripheral cards.

In other embodiments, the first and second interfaces 61a and 61b of the switching card 60 may be replaced with other types of interfaces, such as golden fingers. The switching card 60 may include only one interface mating with the switching interface 10. The first and second peripheral interfaces 20 and 30 may be other types of interfaces, such as peripheral component interconnect (PCI) interfaces, and the number of the peripheral interfaces may be changed according to need. The connection circuit between the pins of the switching card may be changed according to the number and type of the peripheral interfaces. Switches may also be mounted to the switching card 60, to change connection circuit of the switching card 60, so as to change the connection between the first and second CPU sockets 40 and 50 and the first and second peripheral interfaces 20 and 30.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer motherboard comprising:
 a first peripheral interface comprising first and second groups of pins;
 a second peripheral interface comprising third and fourth groups of pins;
 a first central processing unit (CPU) socket comprising fifth and sixth groups of pins, wherein the fifth group of pins of the first CPU socket is connected to the first group of pins of the first peripheral interface;
 a second CPU socket comprising seventh and eighth groups of pins, wherein the eighth group of pins of the second CPU socket is connected to the fourth group of pins of the second peripheral interface;
 a switching interface comprising ninth to twelfth groups of pins, wherein the ninth group of pins of the switching interface is connected to the sixth group of pins of the first CPU socket, the tenth group of pins of the switching interface is connected to the seventh group of pins of the second CPU socket, the eleventh group of pins of the switching interface is connected to the second group of pins of the first peripheral interface, the twelfth group of pins of the switching interface is connected to the third group of pins of the second peripheral interface; and
 a switching card connected to the switching interface, and comprising a first interface and a second interface;
 wherein when the first interface of the switching card is connected to the switching interface, the ninth and tenth groups of pins of the switching interface are respectively connected to the eleventh and twelfth groups of pins of the switching interface; wherein when the second interface of the switching card is connected to the switching interface, the ninth group of pins of the switching interface is connected to the twelfth group of pins of the switching interface, and the tenth and eleventh group of pins of the switching interface are idle.

2. The computer motherboard of claim 1, wherein the first and second interfaces of the switching card are respectively mounted to a top and a bottom of the switching card.

3. The computer motherboard of claim 1, wherein the switching interface is placed between the first and second peripheral interfaces.

4. The computer motherboard of claim 1, wherein the first and second peripheral interfaces are peripheral component interconnect express (PCIE) sockets.

5. A computer motherboard comprising:
 two peripheral interfaces;
 a switching interface connected to each of the two peripheral interfaces;
 two central processing unit (CPU) sockets, each CPU socket connected to one of the two peripheral interfaces and to the switching interface; and
 a switching card connected to the switching interface;
 wherein when two CPUs are inserted in the CPU sockets, respectively, each CPU controls one respective peripheral interface of the two peripheral interfaces and wherein when one of the two CPUs is damaged the other of the two CPUs controls the two peripheral interfaces.

* * * * *